May 21, 1968  F. J. NEWHOUSE  3,384,194

STEERING AND SPEED CHANGE CONTROL FOR MOTOR VEHICLES

Filed Oct. 19, 1965  4 Sheets-Sheet 1

INVENTOR
FRANK J. NEWHOUSE
BY Tweedale & Gerhardt
ATTORNEYS

May 21, 1968

F. J. NEWHOUSE 3,384,194

STEERING AND SPEED CHANGE CONTROL FOR MOTOR VEHICLES

Filed Oct. 19, 1965

INVENTOR
FRANK J. NEWHOUSE

BY Tweedale & Gerhardt

ATTORNEYS

United States Patent Office 3,384,194
Patented May 21, 1968

3,384,194
STEERING AND SPEED CHANGE CONTROL
FOR MOTOR VEHICLES
Frank J. Newhouse, Toronto, Ontario, Canada, assignor to Massey-Ferguson Industries Limited, Toronto, Ontario, Canada
Filed Oct. 19, 1965, Ser. No. 498,011
14 Claims. (Cl. 180—6.2)

ABSTRACT OF THE DISCLOSURE

Speed change mechanism for an agricultural vehicle having a variable transmission operable to simultaneously drive both drive wheels of the vehicle, or producing opposite speed changes in the wheels for turning the vehicle. An actuator in the form of a yoke member is rotatable about an axis transverse to the direction of movement of the machine, and a bell crank control lever has one arm normally received between the yoke side members and its other arm depending therefrom in the neutral position. The depending arm of the steering control lever is connected with the transmission mechanism controlling the speed of the wheels. By rotating the speed change actuator about its transverse axis, the speed of both of the wheels is varied simultaneously for straight line movement, and rotation of the steering control lever relative to the speed change actuator produces opposite speed changes in the wheels for turning the vehicle.

---

This invention relates generally to motor vehicles, and is particularly concerned with a control mechanism for self-propelled agricultural vehicles.

Efficient performance and operation of self-propelled agricultural machines requires that the operator have good all around visibility and be free to observe the operation of all of the components of the machine as it moves across the field. Furthermore, the operator must be free to operate the controls of the various components such as, a harvesting header and other crop treating and gathering mechanism and thus the steering and speed change control of the vehicle must require a minimum amount of effort and attention on his part.

It is therefore an object of this invention to provide a self-propelled agricultural vehicle having a simplified and mechanically efficient steering and speed change control mechanism which will require a minimum amount of attention and effort on the part of the operator in controlling the machine.

Another object is to provide a self-propelled agricultural vehicle in which the operator has maximum visibility and can control the steering and speed of the machine with a minimum amount of effort and attention.

In carrying out the foregoing, and other objects, a speed change mechanism according to the present invention includes a speed change actuator in the form of a yoke member which is rotatable about an axis transverse to the direction of movement of the machine. Fulcrumed between the spaced side members of the yoke is a steering control lever in the form of a bell crank having one arm normally received between the yoke side members and its other arm depending therefrom when the steering controls are in their neutral position. The depending arm of the steering control lever is connected through links with a transmission mechanism controlling the speed of wheels mounted on opposite sides of the vehicle. By rotating the speed change actuator about its transverse axis, the speed of both of the wheels is varied simultaneously for straight line movement of the vehicle, and rotation of the steering control lever relative to the speed change actuator produces opposite speed changes in the wheels for turning the vehicle. Universally connected with the steering control lever is a steering control rod which is operated through a worm gear connection by a steering wheel to raise and lower the steering control rod and produce consequent rotation of the steering control lever relative to the speed change actuator for changing the direction of the vehicle. The worm gear connection permits the operator to set the vehicle on a steering course and let it remain on that course without positive steering of the vehicle.

Preferably, the steering wheel for the vehicle is mounted on a control column projecting upwardly from the central portion of an operator's platform extending throughout the width of the vehicle and located relative to the ground such that the operator has good all around visibility of the terrain and operating components of the vehicle. Preferably, the speed control is provided by means of a lever projecting through the operator's platform having a foot pedal thereon and biased to a full forward speed position such that the operator presses forwardly on the lever to sequentially (1) reduce the forward speed, (2) interrupt the drive to the wheels to place the vehicle in neutral, and (3) place the machine in reverse.

Other objects, advantages and features of the invention will become apparent from the following description taken in connection with the accompanying drawings in which.

Figure 4:
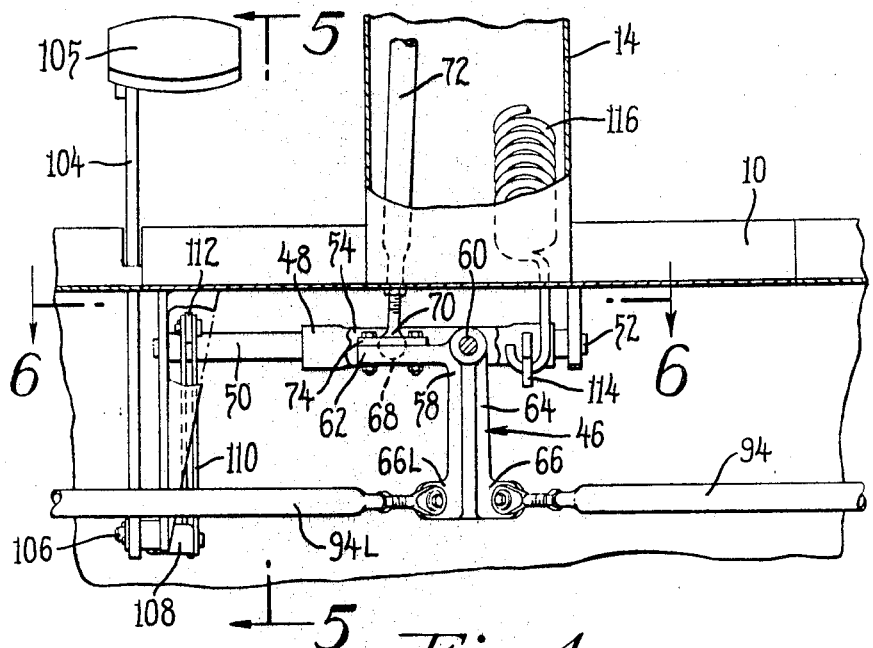
FIG. 4 is a sectional view taken on line 4—4 of FIG. 2.
Figure 5:
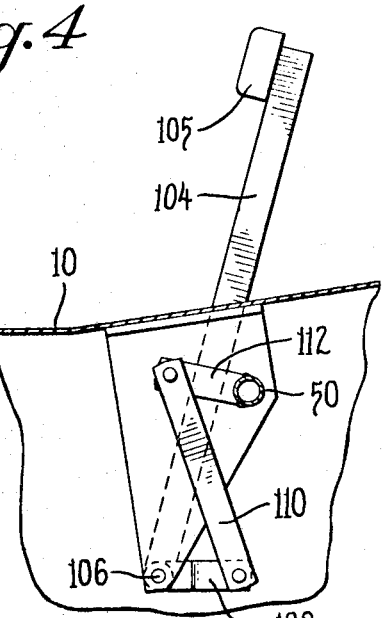
Figure 6:
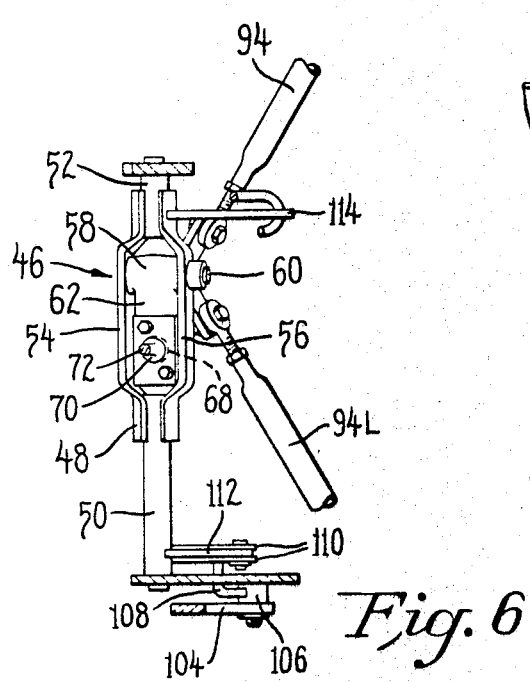
Figure 7:
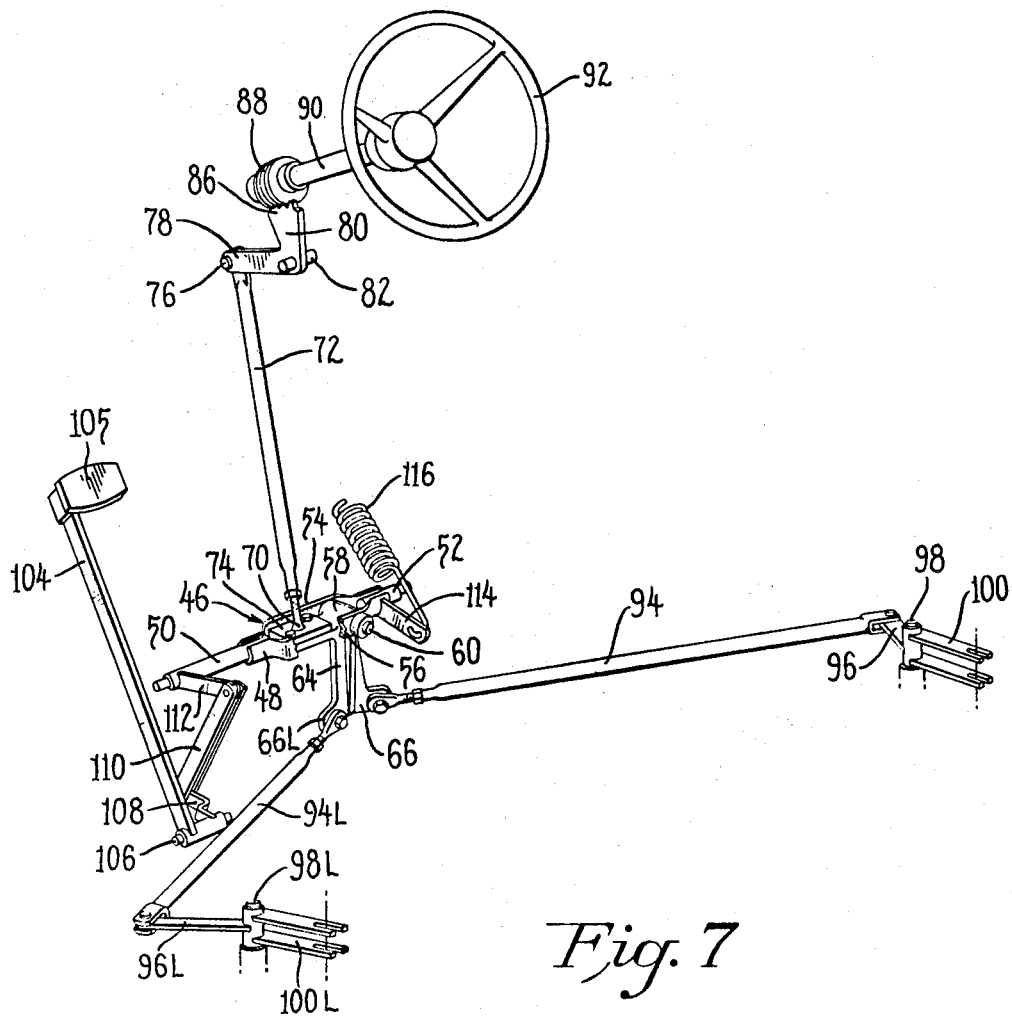

FIGS. 5 and 6 are sectional detailed views taken on lines 5—5 and 6—6, respectively, of FIG. 4; and FIG. 7 is a perspective view of the speed change of steering control mechanism embodying the invention.

At the outset, it should be understood that while a specific preferred embodiment of the invention is disclosed in the foregoing specification and accompanying drawings, such embodiments are given by way of example only, and that the invention is not limited to the exact construction shown. On the contrary, all alternatives in the construction and arrangement of parts, as well as all equivalents falling within the scope and spirit of the invention are intended to be covered herein.

In the following detailed description, reference may be made to the accompanying drawings which form a part hereof, and wherein like reference numerals refer to similar parts throughout.

Figure 1:
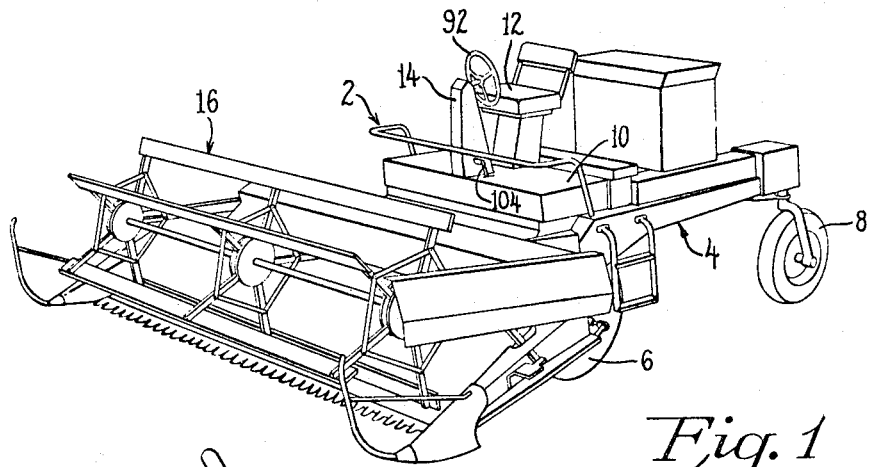
FIG. 1 is a perspective view of an agricultural vehicle equipped with the control mechanism embodying the invention.

With reference to FIG. 1, a self-propelled agricultural vehicle is designated collectively by reference numeral 2 and includes a main body or frame 4 supported on a pair of front wheels 6 (only one of which is visible in the drawing) and a rear, caster wheel 8. Mounted on the forward portion of the main body 4 is an operator's platform 10, which supports the seat 12 and control column 14 which are located substantially along the longitudinal axis of the vehicle. Mounted on the forward portion of the vehicle is a crop gathering header 16.

Figure 3:
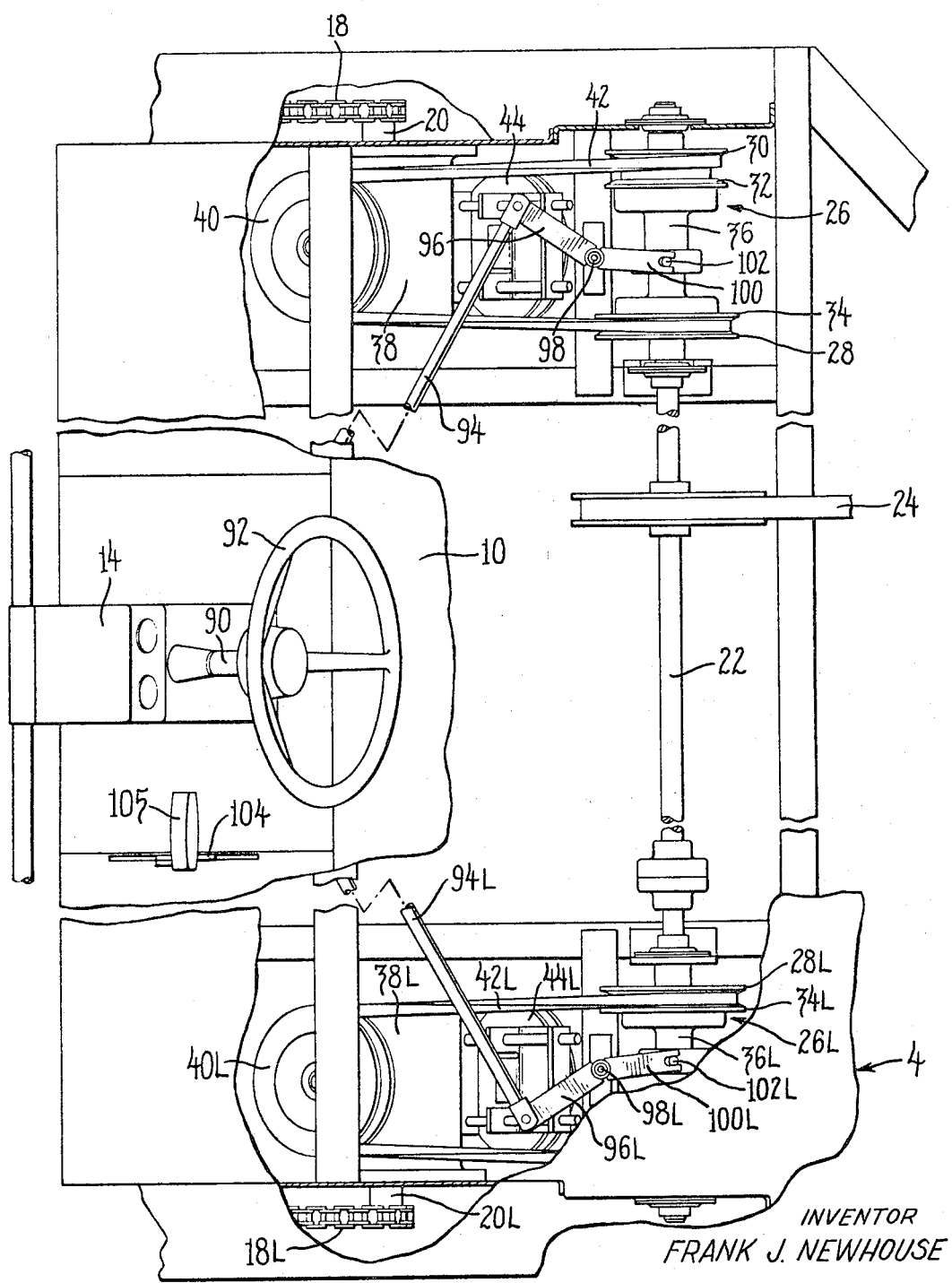
FIG. 3 is a fragmentary plan view of the vehicle of FIG. 1 with parts broken away to show details of the control mechanism.

The front wheels 6 are each supported for independent rotation on frame 4. The right hand wheel 6 is driven by a sprocket chain 18 (FIG. 3) and the left hand wheel 6 is driven by a sprocket chain 18L. Each of the wheels 6 has a separate drive and transmission arrangement, and since the drive and transmission units for each wheel is identical except for being left and right handed, the left hand structure will be identified by the same reference numerals as that of the right hand structure but followed by a suffix L.

Sprocket chain 18 is driven by a shaft 20 from an engine driven main shaft 22. Shaft 22 is driven from the engine by a main drive belt 24. Drive from main shaft 22 to the driven shafts 20, 20L passes through transmission units 26 and 26L of the type disclosed in U.S. Patent 3,190,385, the entire disclosure of which is incorporated herein by reference.

Transmission unit 26 includes a forward drive pulley 28 and a reverse drive pulley 30, each of which are of the variable pitch cone type with pulley 28 providing speed variation. Pulley 30 has a movable pulley member 32, and pulley 28 has a movable pulley member 34. The movable pulley members 32 and 34 are integral with, or secured to, a movable control member 36 which shifts the movable pulleys in opposite directions to connect the associated front wheel 6 with forward or reverse drive, or in the intermediate position of control member 36 the drive to the wheel 6 is interrupted to place the transmission unit in neutral.

Shafts 20 and 20L are driven by gear boxes 38 and 38L, respectively, each having input shafts on which is mounted pulleys 40 and 40L. Pulley 40 is driven from transmission unit 26 by a belt 42 extending over each of the variable pulleys 28 and 30 as well as pulley 40 and an idler pulley 44. As fully disclosed in the above referred to Patent 3,190,385, movement of control member 36 downwardly as viewed in FIG. 3 tends to increase the forward speed of the associated wheel 6 and, conversely, movement of control member 36 upwardly or in the opposite direction sequentially (1) reduces the speed of the associated wheel 6, (2) interrupts the drive to the wheel 6, and (3) connects the wheel to be driven in reverse. Control member 36L moves in the opposite direction to produce the same sequence, that is, control member 36L moves upwardly toward forward and downwardly toward reverse, and the further upward that control member 36L moves, the more the speed increases for its associated wheel 6.

The steering and drive control mechanism for selectively shifting the transmission units 26 and 26L between their positions is illustrated primarily in FIGS. 4 through 7. With the mechanism shown in FIGS. 4 through 7, the speed of both of the front wheels 6 of the vehicle can be varied during straight line movement of the vehicle by simultaneously shifting control members 36 and 36L in opposite directions. Opposite speed changes can be produced in wheels 6 to cause the vehicle to turn by shifting control members 36 and 36L in the same direction.

Mounted beneath the operator's platform 10 is a transmission adjacent assembly 46 which includes a speed change actuator 48 in the form of a yoke member having shafts 50 and 52 at its opposite ends which are rotatably mounted in the framework of the vehicle. The speed change yoke member has a pair of side members 54 and 56 which are located on opposite sides of the axis of rotation of shafts 50 and 52. Fulcrumed between side members 54 and 56 on a pin 60 is a steering control lever 58 in the form of a bell crank having an arm 62 which, in the neutral position of the steering lever, is received between side members 54 and 56. Lever 58 has an arm 64 which depends from pin 60 beneath the speed change actuating yoke 48.

Projecting outwardly and rearwardly from the lower end of arm 64 of lever 58 is a pair of attachment lugs 66 and 66L which project from arm 64 at an obtuse angle with respect to each other. Arm 62 of lever 58 is formed with a spherical recess 68 at a point spaced from the axis of pin 60 for receiving a ball 70 on the end of a steering control rod 72. Ball 70 is rotatably secured within recess 68 by a ball retainer plate 74 bolted onto arm 62 of lever 58.

Figure 2:
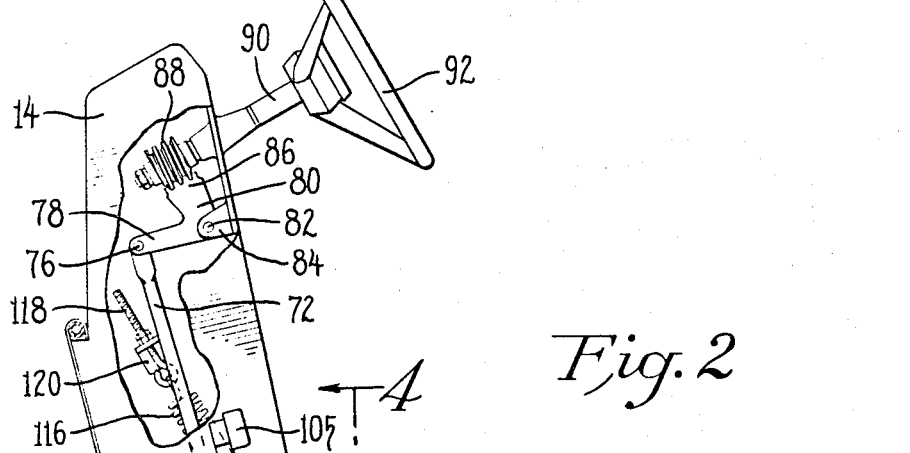
FIG. 2 is a fragmentary sectional view taken substantially along the longitudinal axis of the vehicle of FIG. 1.

With reference to FIGS. 2 and 7, the steering control rod 72 projects upwardly within control column 14 and has its upper end pivotally connected at 76 with one arm 78 of a bell crank 80. Bell crank 80 is pivotally mounted by a pin 82 on a support bracket 84 projecting forwardly from the rear wall of control column 14. The other arm 86 of bell crank 80 is in the form of a toothed segment engaged with a worm wheel 88 mounted on a steering shaft 90 rotatably supported adjacent the upper end of control column 14. Steering shaft 90 has a steering wheel 92 mounted on its opposite end from worm wheel 88.

The steering mechanism is shown in it neutral position in the drawings. By turning wheel 92 to the right, or clockwise as viewed in FIGS. 3 and 7, bell crank 80 rotates about pin 82 in a clockwise direction to cause steering control rod 72 to move upwardly and pivot steering lever 58 in a clockwise direction about pin 60 resulting in arm 64 swinging toward the left in FIGS. 4 and 7. Conversely, rotation of wheel 92 toward the left, or counterclockwise, causes rod 72 to move downwardly and swing arm 64 of lever 58 toward the right in FIGS. 4 and 7.

The pivotal movement of lever 58 about the axis of pin 60 is transmitted to control members 36 and 36L of the transmission units through connecting links or rods 94 and 94L, respectively, each having one end pivotally connected with attachment lugs 66, 66L, respectively, and their other ends pivotally connected with levers 96 and 96L, respectively. Lever 96 is mounted on a sleeve member received on a shaft or pin 98, the sleeve having a pair of forked shifter members 100 projecting therefrom into engagement with a pin 102 on control member 26. As a consequence, rotation of lever 96 and shifter member 100 about the axis of pin 98 causes control member 36 to move along the axis of shaft 22.

Thus, when the steering wheel 92 is turned toward the right, arm 64 of lever 58 swings toward the left in FIGS. 4 and 7 causing the shifter members 100 and 100L to both shift toward the right in FIG. 7 to move control members 36, 36L in the same direction. Control member 36 moves in a direction to reduce the speed of the right wheel 6 and control member 36L moves in a direction to increase the speed of the left wheel 6 to cause vehicle to turn to the right. Since movement of bell crank 80 can be transmitted in only one direction, that is through the worm wheel 88, steering wheel 92 will remain in any particular setting until positively rotated from such setting. Consequently, the vehicle can be set on a steering course and the operator does not have to positively steer the vehicle until the course is to be changed.

For actuating control members 36 and 36L in opposite directions to simultaneously vary the speed of both wheels 6 for straight line travel, the speed change actuator 46 is rotated about the axis of shafts 50 and 52. Projecting through a slot in platform 10 is a speed change control lever 104 having a foot pedal 105 at its upper end. Lever 104 has its lower end fixed to a shaft 106 rotatably journalled in a bracket supported beneath the floor of platform 10. Fixed to shaft 106 is a lever 108 having one end pivotally connected with a link 110, the other end of link 110 being pivotally connected with a lever 112 fixed to shaft 50. Forward movement of lever 104 about shaft 106 causes clockwise rotation of the speed change actuator 48 as viewed in FIG. 2 or from the left hand end of shaft 50 in FIG. 7.

Clockwise rotation of yoke 48 causes arm 64 of lever 58 to swing forwardly about the axis of shaft 50 and 52 resulting in simultaneous forward movement of connecting links 94 and 94L. As a result, shifter members 100 and 100L move in opposite directions with respect to each other to shift control members 36 and 36L in opposite directions and thus apply the same speed change to both wheels 6. In the rearward most position of lever 104 and foot pedal 105, the wheels are driven through pulleys 34 and 34L at their maximum forward speed, and at the forward most position of lever 104 that is, the furthest counterclockwise position about shaft 106 in FIG. 2, the wheels are driven through the reverse pulleys 30 and 30L. In the intermediate position of lever 104, drive to both wheels is simultaneously interrupted to place the vehicle in neutral.

In the illustrated embodiment, a lever 114 projects from actuator 48 adjacent shaft 52 for supporting one end of a spring 116, the other end of which is supported in an anchor bolt 118 mounted in a bracket 120, formed on a wall of control column 14. Spring 116 biases foot pedal 105 to its rearmost position such that the vehicle is normally set to travel in a forward direction at maximum speed. Thus, the operator pushes forward on foot pedal 105 to sequentially reduce the forward speed, interrupt the drive to the wheels, and drive the vehicle in reverse.

With the control console 14 mounted centrally on the vehicle on platform 10, the operator is afforded the maximum visibility on both sides of the vehicle as well as in a forward direction. The steering wheel 92 is connected with the adjustment mechanism 46 directly through rod 72 and the ball and socket connection permits universal movement of lever 58 with respect to rod 72 regardless of the position of the speed change actuator 48. The worm drive connection between the steering wheel and control rod 72 permits the operator to set the vehicle on a steering course without constant steering and the vehicle will remain on the set course until the operator changes the setting of steering wheel 92. This permits the operator to perform other tasks while the implement progresses along its course. To change the speed or reverse the direction of movement of the vehicle, the operator merely has to press on foot pedal 105 to get the desired correction.

Preferably, the drive from the engine to main shaft 22 can be selectively interrupted with the engine running either full throttle or, at idle, permitting the operator to dismount from the machine without shutting off the engine.

It will be apparent to those skilled in the art that other forms may be adopted without departing from the scope and spirit of the invention.

I claim:

1. A motor vehicle including: a pair of power driven traction devices, one on each side of the vehicle; variable transmission means selectively operable for simultaneously driving both of said traction devices at the same speed, or for producing opposite speed changes in said traction devices and consequent turning of the vehicle, said transmission means comprising a pair of individually variable transmission units, one for each traction device; movable control means for actuating said transmission means to concurrently vary the speed of both traction devices, or producing opposite speed changes in the traction devices for turning the vehicle, said control means comprising a pair of control members, one for each transmission unit, movable in opposite directions to vary the speed of its associated traction device; a speed change actuator mounted on the vehicle for rotation about a fixed, horizontal axis, said speed change actuator comprising a yoke member having spaced side members located on opposite sides of said fixed axis; a steering lever mounted on said speed change actuator for pivotal movement with respect thereto about a horizontal axis normal to said fixed axis such that said steering lever swings about said fixed axis in response to rotation of said speed change actuator; a vertically movable steering control rod having one end universally connected with said steering lever at a point spaced from the pivotal axis of the steering lever for actuating the steering lever to pivot in opposite directions with respect to said speed change actuator in response to up and down movement of said steering control rod, said steering lever comprising a bell crank lever pivotally mounted between said side members and having one arm connected with one end of said steering control rod, and its other arm pivotally connected with said connecting means; a speed change lever connected with said speed change actuator for rotating said speed change actuator about said fixed axis independently of the steering control rod; and means connecting said control means with said steering lever operable to actuate said control means in a direction to vary the speed of both traction devices simultaneously in response to rotation of said speed change actuator about said fixed axis, and operable to actuate said control means in a direction to produce opposite speed changes in the traction devices for turning the vehicle in response to pivotal movement of the steering lever with respect to said speed change actuator.

2. A motor vehicle as defined in claim 1 wherein said one arm of said steering lever is formed with a spherical socket, and said one end of said steering control rod is formed with a ball received in said socket to permit swinging movement of said steering lever about said fixed axis without causing pivotal movement of said steering lever with respect to said speed change actuator.

3. A motor vehicle including; a pair of power driven traction devices, one on each side of the vehicle; variable transmission means selectively operable for simultaneously driving both of said traction devices at the same speed, or for producing opposite speed changes in said traction devices and consequent turning of the vehicle; movable control means for actuating said transmission means to concurrently vary the speed of both traction devices, or producing opposite speed changes in the traction devices for turning the vehicle; a speed change actuator mounted on the vehicle for rotation about a fixed, horizontal axis; a steering lever mounted on said speed change actuator for pivotal movement with respect thereto about a horizontal axis normal to said fixed axis such that said steering lever swings about said fixed axis in response to rotation of said speed change actuator; a vertically movable steering control rod having one end universally connected with said steering lever at a point spaced from the pivotal axis of the steering lever for actuating the steering lever to pivot in opposite directions with respect to said speed change actuator in response to up and down movement of said steering control rod; a speed change lever connected with said speed change actuator for rotating said speed change actuator about said fixed axis independently of the steering control rod; means connecting said control means with said steering lever operable to actuate said control means in a direction to vary the speed of both traction devices simultaneously in response to rotation of said speed change actuator about said fixed axis, and operable to actuate said control means in a direction to produce opposite speed changes in the traction devices for turning the vehicle in response to pivotal movement of the steering lever with respect to said speed change actuator, a steering shaft rotatably mounted on said vehicle above said speed change actuator and steering lever; a worm gear mounted on said steering shaft; a gear segment mounted on said vehicle for pivotal movement about an axis normal to said steering shaft and engaged with said worm such that rotation of said steering shaft causes pivotal movement of said gear segment; and a lever arm projecting from said gear segment and pivotally connected with the other end of said steering control rod for causing up and down movement of said control rod in response to rotation of said steering shaft.

4. A motor vehicle as defined in claim 3 wherein said transmission means comprises a pair of individually variable transmission units, one for each traction device; said control means comprises a pair of control members, one for each transmission unit, said control members being movable in opposite directions to vary the speed of its associated traction device; said speed change actuator comprises a yoke member having spaced side members located on opposite sides of said fixed axis; and wherein said steering lever comprises a bell crank pivotally mounted between said side members and having one arm connected with said one end of said steering control rod and its other arm pivotally connected with said connecting means.

5. A motor vehicle as defined in claim 4 further including a pair of shifter forks, one for each control member, pivotally mounted on the vehicle, a pin on each control member engaged with the associated shifter fork, and wherein said connecting means comprises a link having one end pivotally connected with one of the shifter forks and its other end pivotally connected with said other arm of said steering lever.

6. A motor vehicle as defined in claim 4 wherein said speed change lever is biased in a direction to shift said control members in the direction to simultaneously drive said traction devices at maximum forward speed, and is selectively operable against said biasing means to sequentially interrupt the drive to said traction devices and reverse the drive to said traction devices.

7. A motor vehicle including: a pair of power driven traction devices, one on each side of the vehicle; variable transmission means selectively operable for simultaneously driving both of said traction devices at the same speed, or for producing opposite speed changes in said traction devices and consequent turning of the vehicle movable control means for actuating said transmission means to concurrently vary the speed of both traction devices, or producing opposite speed changes in the traction devices for turning the vehicle; a speed change actuator mounted on the vehicle for rotation about a fixed, horizontal axis; a steering lever mounted on said speed change actuator for pivotal movement with respect thereto about a horizontal axis normal to said fixed axis such that said steering lever swings about said fixed axis in response to rotation of said speed change actuator; a vertically movable steering control rod having one end universally connected with said steering lever at a point spaced from the pivotal axis of the steering lever for actuating the steering lever to pivot in opposite directions with respect to said speed change actuator in response to up and down movement of said steering control rod; a speed change lever connected with said speed change actuator for rotating said speed change actuator about said fixed axis independently of the steering control rod; and means connecting said control means with said steering lever operable to actuate said control means in a direction to vary the speed of both traction devices simultaneously in response to rotation of said speed change actuator about said fixed axis, and operable to actuate said control means in a direction to produce opposite speed changes in the traction devices for turning the vehicle in response to pivotal movement of the steering lever with respect to said speed change actuator, an operator's platform overlying said speed change actuator and said steering lever and extending between said traction devices, a hollow control column projecting upwardly from said platform substantially along the longitudinal axis of the vehicle and enclosing said steering control rod, and wherein said speed change lever projects through said platform adjacent said hollow control column so as to be accessible on the operator's platform.

8. A motor vehicle as defined in claim 7 further including a steering shaft rotatably mounted on said control column adjacent the upper end thereof and projecting into the interior of the hollow control column, and means interconnecting said steering shaft and steering control rod for causing up and down movement of said steering control rod in response to rotation of said steering shaft in said control column.

9. A motor vehicle as defined in claim 8 wherein said means interconnecting said steering shaft and steering control rod comprises; a worm gear mounted on said steering shaft; a bell crank lever mounted on the interior wall of said control column and having one arm pivotally connected with the steering control rod, and the other arm of said bell crank being in the form of a toothed segment engaged with said worm gear.

10. A motor vehicle as defined in claim 9 wherein said transmission means comprises a pair of individually variable transmission units, one for each traction device; and wherein said control means comprises a pair of control members, one for each transmission unit, said control members being movable in opposite directions to vary the speed of its associated traction device.

11. A motor vehicle as defined in claim 10 wherein said speed change actuator comprises a yoke member having spaced side members located on opposite sides of said fixed axis; and wherein said steering lever comprises a bell crank lever pivotally mounted between said side members and having one arm connected with one end of said steering control rod, and its other arm pivotally connected with said connecting means.

12. A motor vehicle as defined in claim 11 wherein said one arm of said steering lever is formed with a spherical socket, and said one end of said steering control rod is formed with a ball received in said socket to permit swinging movement of said steering lever about said fixed axis without causing pivotal movement of said steering lever with respect to said speed change actuator.

13. A motor vehicle as defined in claim 12 further including a pair of shifter forks, one for each control member, pivotally mounted on the vehicle, a pin on each control member engaged with the associated shifter fork, and wherein said connecting means comprises a link having one end pivotally connected with one of the shifter forks and its other end pivotally connected with said other arm of said steering lever.

14. A motor vehicle as defined in claim 13 wherein said speed change lever is biased in a direction to shift said control members in the direction to simultaneously drive said traction devices at maximum forward speed, and is selectively operable against said biasing means to sequentially interrupt the drive to said traction devices and reverse the drive to said traction devices.

References Cited

UNITED STATES PATENTS

| | | | |
|---|---|---|---|
| 2,818,126 | 12/1957 | Vogelaar | 180—6.48 |
| 3,181,389 | 5/1965 | Richard | 74—480 |
| 3,190,385 | 6/1965 | Allport | 180—6.66 |

LEO FRIAGLIA, *Primary Examiner.*

BENJAMIN HERSH, *Examiner.*

J. A. PEKAR, *Assistant Examiner.*